United States Patent
Gresset et al.

(10) Patent No.: US 10,674,673 B2
(45) Date of Patent: Jun. 9, 2020

(54) BALE WRAPPER AND ROUND BALER WITH SUCH A DEVICE

(71) Applicant: DEERE & COMPANY, Moline, IL (US)

(72) Inventors: Pascal Gresset, Auxon Dessous (FR); Jean-Francois Fournier, Chargey les Gray (FR)

(73) Assignee: DEERE & COMPANY, Moline, IL (US)

( * ) Notice: Subject to any disclaimer, the term of this patent is extended or adjusted under 35 U.S.C. 154(b) by 577 days.

(21) Appl. No.: 14/670,456

(22) Filed: Mar. 27, 2015

(65) Prior Publication Data

US 2015/0305244 A1    Oct. 29, 2015

(30) Foreign Application Priority Data

Apr. 29, 2014   (DE) .................... 10 2014 208 081

(51) Int. Cl.
*A01F 15/07* (2006.01)
*B65B 41/12* (2006.01)

(52) U.S. Cl.
CPC .......... *A01F 15/0715* (2013.01); *B65B 41/12* (2013.01); *A01F 2015/0725* (2013.01)

(58) Field of Classification Search
CPC ......... A01F 15/0715; A01F 2015/0725; B65B 41/12
USPC .......................................... 53/389.2; 56/190
See application file for complete search history.

(56) References Cited

U.S. PATENT DOCUMENTS

| | | | | |
|---|---|---|---|---|
| 2,691,266 A | * | 10/1954 | Meyer | A01D 41/10 56/341 |
| 3,943,845 A | * | 3/1976 | Mecklin | A01F 15/101 100/142 |
| 4,956,968 A | * | 9/1990 | Underhill | A01F 15/0715 100/88 |
| 5,036,642 A | * | 8/1991 | Underhill | A01F 15/0715 53/118 |

(Continued)

FOREIGN PATENT DOCUMENTS

| | | |
|---|---|---|
| DE | 69015338 T2 | 5/1995 |
| EP | 0432830 A1 | 6/1991 |

(Continued)

OTHER PUBLICATIONS

European Search Report issued in counterpart application No. 15164062.0, dated Oct. 6, 2015 (6 pages).

(Continued)

*Primary Examiner* — Robert F Long
*Assistant Examiner* — Patrick B Fry

(57) ABSTRACT

A bale wrapper and a round baler with such a device are described. The bale wrapper comprises a supply device, extending along the width of a bale chamber of a round baler, for the introduction of wrapping material. The supply device comprises a shielding layer, located on its upper side, for the upper-side shielding of a free end of the wrapping material, to be introduced into the bale chamber. In order to improve the supply operation of wrapping material into the bale chamber, the shielding layer comprises several shielding lips, located parallel to one another along the width of the bale chamber, which extend in the direction of an interior of the bale chamber.

4 Claims, 4 Drawing Sheets

(56) References Cited

U.S. PATENT DOCUMENTS

| | | | | |
|---|---|---|---|---|
| 5,319,899 | A | * | 6/1994 | Jennings ............ A01F 15/0715 53/118 |
| 5,479,767 | A | * | 1/1996 | McClure ................ A01F 15/07 100/15 |
| 6,810,650 | B2 | * | 11/2004 | McClure ................ A01D 41/10 56/190 |
| 7,237,372 | B2 | | 7/2007 | Chapon et al. |
| 7,322,167 | B2 | | 1/2008 | Chapon et al. |
| 7,513,088 | B2 | | 4/2009 | Vande Ryse |
| 8,051,634 | B2 | * | 11/2011 | McIlwain ............... A01D 41/10 56/190 |
| 8,522,512 | B2 | | 9/2013 | Paillet et al. |
| 8,601,770 | B2 | | 12/2013 | Paillet et al. |
| 9,016,032 | B2 | * | 4/2015 | Chapon ................ A01F 15/071 53/203 |
| 9,386,750 | B2 | * | 7/2016 | Verhaeghe ......... A01F 15/0825 |
| 2005/0091959 | A1 | | 5/2005 | Viaud et al. |
| 2006/0242931 | A1 | | 11/2006 | Ryse |
| 2009/0272072 | A1 | | 11/2009 | Paillet et al. |
| 2012/0233963 | A1 | | 9/2012 | Chapon et al. |
| 2012/0240516 | A1 | | 9/2012 | Chapon et al. |
| 2012/0240517 | A1 | * | 9/2012 | Chapon ............... A01F 15/0715 53/203 |
| 2012/0240520 | A1 | | 9/2012 | Gresset et al. |

FOREIGN PATENT DOCUMENTS

| | | |
|---|---|---|
| EP | 2113165 A1 | 11/2009 |
| EP | 2113165 B1 | 8/2011 |
| WO | 2005009112 A2 | 2/2005 |

OTHER PUBLICATIONS

German Search Report issued in counterpart application No. 10 2014 208 081.9, dated Mar. 18, 2015 (10 pages).

* cited by examiner

BALE WRAPPER AND ROUND BALER WITH SUCH A DEVICE

CROSS-REFERENCE TO RELATED APPLICATIONS

Pursuant to 35 USC § 119, this application claims the benefit of and priority to German patent application no. 102014208081.9, filed on Apr. 29, 2014, which is herein incorporated by reference in its entirety.

FIELD OF THE DISCLOSURE

The invention concerns a bale wrapper for a round baler, with a supply device extending along the width of a bale chamber of a baling compacter, for the introduction of wrapping material into the bale chamber, wherein the supply device comprises a shielding layer for the upper-side shielding of a free end of the wrapping material, which is to be introduced into the bale chamber. Furthermore, the invention concerns a round baler with such a device.

BACKGROUND

Bale wrappers for round balers are known. Compacted material shaped to form round bales in round balers, for example, agricultural crops, but also leftover paper or bits of material, is wrapped with a wrapping material, for example, mesh or foil. Such bale wrapper devices usually have a supply device for the introduction of the wrapping material into the bale chamber of the round baler, wherein, in one supplying movement, the supply device pulls the wrapping material from a supply roll and introduces it into a supply opening of the bale chamber, located between two compacting rollers—an upper and a lower compacting roller (or compacting belts conducted around them). A shielding layer or a shielding mat, located on the upper side of the supply device, shields the end of the wrapping material to be introduced, relative to an upper compacting roller in the area of the supply opening, so that the wrapping material to be introduced is gripped and transported only by the lower compacting roller (or the compacting belt conducted around it) and by the round bales rotating in the bale chamber. Thus, the wrapping material is not hooked on the upper compacting roller (or the compacting belt conducted around it) or gripped by it (or the belt), wherein the wrapping material would not be carried on by the round bales. The shielding layer is formed, in a known manner, by an elastic mat extending along the width of the compacting chamber, for example, a rubber mat or a rubber lip, which extends in the direction of the in-feed opening of the end of the wrapping material, so that the shielding layer is supported between the upper compacting roller (or a compacting belt conducted around it) and the supply device, wherein contact between the wrapping material and the upper compacting roller (or a compacting belt conducted around it) is to be prevented. Due to wind or crops which collect in the area of the shielding layer during the baling operation or which stick there in certain areas, it is possible for the shielding layer to be raised in certain areas, wherein it is often the case that the shielding layer will perhaps come into contact with the upper compacting roller (or a compacting belt conducted around it), along the width of the bale chamber, and the layer is then carried along by the compacting roller (or the belt). This can, in turn, lead to a folding or turning up or down of the shielding layer over the entire width, and thus, the shielding function for the wrapping material while it is being introduced into the supply opening is also lost. Furthermore, in this way, a folding or turning up or down of the free end of the wrapping material can be produced, which thus, perhaps, can even stick between the shielding layer and the supply device.

SUMMARY

The goal of the invention is therefore to be found in a bale wrapper of the type mentioned in the beginning by means of which the aforementioned problems are overcome.

The goal is attained, in accordance with the invention, by the teaching of Patent claim 1. Other advantageous developments and refinements of the invention can be deduced from the subclaims.

In accordance with the invention, a bale wrapper of the type mentioned in the beginning has a shielding layer, which comprises several shielding lips or shielding layer segments, arranged parallel to one another along the width of the bale chamber, which extend in the direction of the interior of the bale chamber. With such a shielding layer or shielding mat, preferably made of rubber or another elastic material, the shielding layer is affected only partially—that is, segment-wise or only relative to the affected shielding lip—when in contact with the compacting roller (or a compacting belt conducted around it). Thus, a folding or turning up or down of the shielding layer takes place only partially—that is, segment-wise or only relative to the affected shielding lip. The nonaffected part of the shielding layer or the nonaffected shielding layer segments can thus continue to comply unhindered with their function for the protection of the wrapping material. Thus, the problems that appear during the supply of the wrapping material, in particular, an insufficient carrying on of the wrapping material by the round balers, or one that is absent, can be minimized.

The individual shielding lips or shielding segments extend from a stationary end on a common shielding lip holder, which extends along the width of the bale chamber, to a free end in the direction of the interior of the bale chamber. The shielding lip holder can be designed, for example, using a component that extends on a frame of the supply device and over the width of the bale chamber, in the form of a track, clamping strip, angle profile, rod, etc. Screw connections, hinges, rivets, clamping connections, or other connections, can be provided on the component; with these connections, the entire shielding layer or the individual shielding lips or shielding layer segments are affixed on the supply device.

On the end of a shielding lip or a shielding layer segment facing the bale chamber, it is designed to taper along the width, so that the shielding lips are reduced in their width on their free end. In this way, rounded-off or beveled corner contours are formed on the free ends of the shielding lips, wherein a hooking of the wrapping material with the corner areas of the shielding lips—for example, during a springing back after a folding or turning up or down—can be prevented, or also, a deformation of the corner areas due to heating (sun, operating temperature) can be avoided.

In order to guarantee a satisfactory springing back of the shielding lips, without remaining deformation traces, the shielding lips are to be designed with thin layers, if possible, and elastic. Preferably, they can be produced from rubber, a foam material, or another elastic material, or one which can be deformed reversibly when acted on by the force of a spring.

The shielding lips can be connected with the shielding lip holder in a detachable manner, so that they can be separately replaced or exchanged in case of damage or wear and tear of the shielding lip holder.

The shielding lip holder can comprise a device in which the shielding lips are individually clamped or held. It can be designed, for example, as a clamp rail or a clamp profile. It is, however, also conceivable to provide connecting holes or recesses on the stationary ends of the shielding lips and on the shielding lip holder, with which the shielding lips can be connected by screwing, riveting, or in some other way. A cementing of the stationary ends with a profiled holding rail is likewise conceivable and practical. By means of a connection of the individual shielding lips on the shielding holder, provided separately from one another, an exchange can be carried out in segments, without renewing the shielding layer over the entire width.

For reasons having to do with manufacturing technology and in view of material costs, it may be sensible for the shielding layer to comprise a shielding lip base with which the shielding lips are connected on their stationary end, in a detachable or nondetachable manner, wherein the shielding lip base is clamped or held in the shielding lip holder. Thus, the individual shielding lips can be designed parallel next to one another, along the width of the bale chamber, as separate shielding layer segments, but can be connected with one and the same shielding lip base, for example, by being soldered, screwed, cemented, or even cut or made from one piece, together with the shielding lip base. The shielding lip base thereby serves as a connecting element between the shielding lips and the shielding lip holder, wherein the embodiments that were already mentioned in the paragraph before, in particular, the development forms and affixing modes for the shielding lip holder, are to be used here also.

The embodiments for a bale wrapper mentioned above are suitable, in particular, for use in a round baler of the agricultural type for the compacting of crops, clippings, stalks, etc. However, other application fields can also be conceivable, for example, in the area of the paper industry or recycling of textiles and other consumer goods. Suitable material for wrapping can include, in particular, mesh or foil, which is wrapped for a shape-fitting storage, for the purpose of better handling or also for the protection of the round bale from weathering influences in one or more places around the bales. Furthermore, the use of foil also takes place for the storage of round bales for silage purposes.

With the aid of the drawing which shows an embodiment example of the invention, the invention and other advantages or advantageous refinements and developments of the invention are described and explained below.

DETAILED DESCRIPTION

Figure 1:
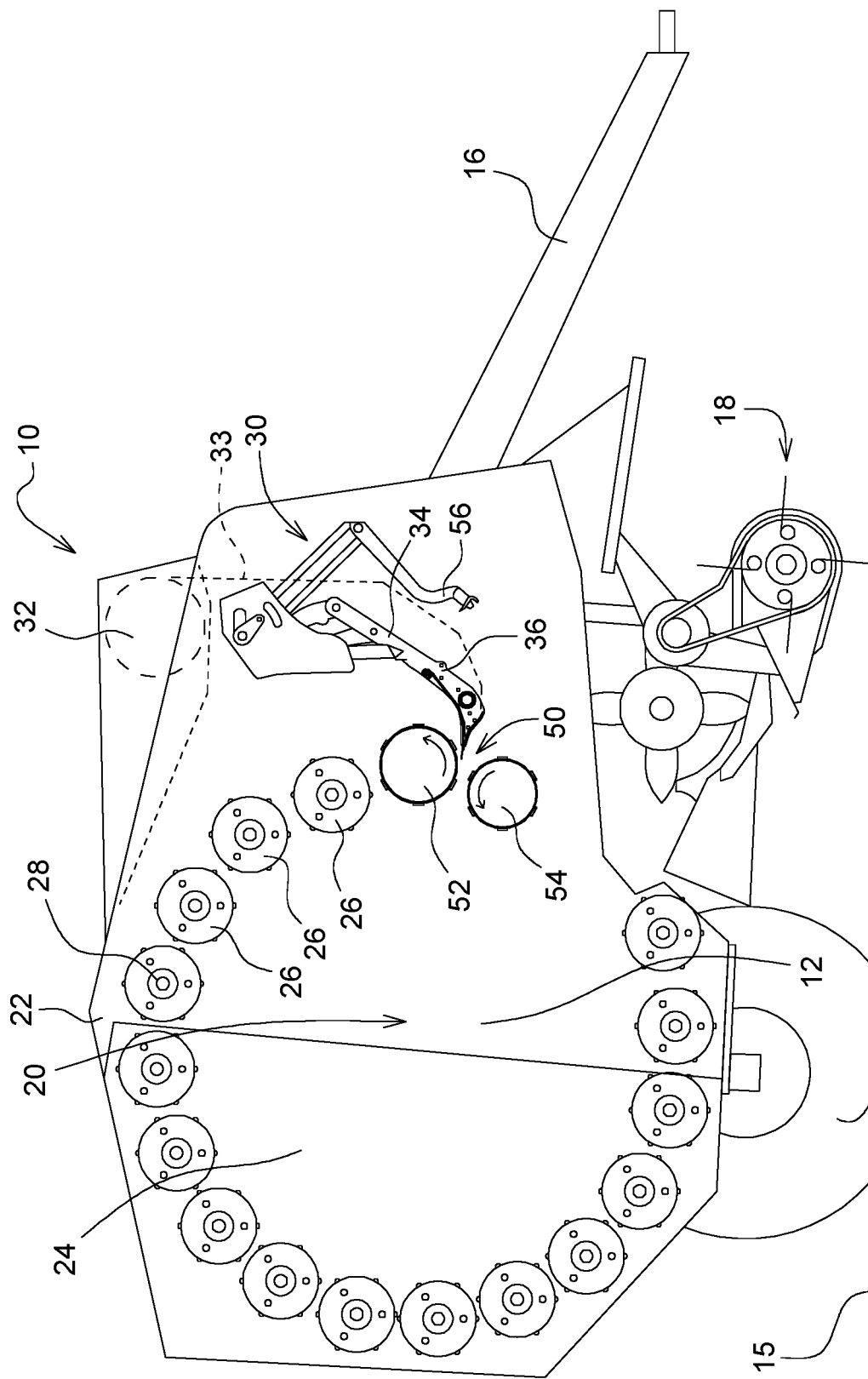
FIG. 1 a schematic side view of a round baler with a bale wrapper, comprising a supply device for wrapping material.

A round baler 10, schematically shown in FIG. 1, comprises a first housing part 12, which is supported on the ground 15 by means of wheels 14 and which, by means of a tow bar 16, can be connected to a nondepicted towing vehicle, for example, an agricultural tractor.

A holding and conveying device 18 for crops is located, in a known manner, on a front, lower side of the first housing part 12, in the forward direction, wherein the first housing part 12 surrounds a front part of a bale chamber 20. A bearing 22 for a swiveling second housing part 24 is located on the rear, upper corner area of the first housing part 12; it surrounds a back part of the bale chamber 20. The second housing part 24 releases to an outlet (not depicted), when opened (not depicted), by means of which a bale (not depicted), compacted by the round baler 10, can be set down or unloaded or thrown out. The swiveling second housing part 24 can be activated by means of a (nondepicted) servomotor (can be opened and closed) and thus is an outlet flap for a bale that was compacted in the bale chamber 20.

The round baler 10, designed with a bale chamber 20 that is unchangeable in size, contains a number of compacting elements running parallel to one another to compact crops in the form of compacting rollers 26 (as examples, only a few compacting rollers 26 were marked with the reference symbol "26"), whose rotation axes 28 are placed on a circular arc, when the second housing part 24 is closed, and of which at least a few are driven. Alternatively, the round baler 10 can also be designed, in a known manner, as such with a bale chamber 20 that can be changed in size or as a round baler 10 with a variable bale chamber 20, wherein the compacting elements can then be designed, also in a known manner, as belts, straps, or chain arrangements (not depicted).

Furthermore, the round baler 10 comprises a bale wrapper 30, which is equipped with a supply roller 32 for wrapping material 33. As wrapping material, one can preferably use a mesh or a foil. The bale wrapper 30 comprises a supply device 34 for the wrapping material 33, by means of which the wrapping material 33 is conducted from the supply roller 32 into the bale chamber 20.

After the actual compacting operation—that is, the take-in of crops and the formation of a round bale by the compacting rollers 26—is finished, movement over the floor 15 is interrupted, since the round baler 10 is filled with round bales and no more crops should or can be taken up in the bale chamber 20. At this time, the bale wrapper 30 is activated, and a wrapping operation, following the compacting operation, is introduced. By means of a continuous rotation of the round bale, found in the bale chamber 20, the wrapping material 33 is wrapped around the round bale 20. After a wrapping operation is finished, the round bale is released to the floor 15 by opening the outlet flap (second housing 24) via this discharge ramp (not depicted). Then, the movement with the round baler 10 is again taken up and a new compacting operation begins.

Figure 2:
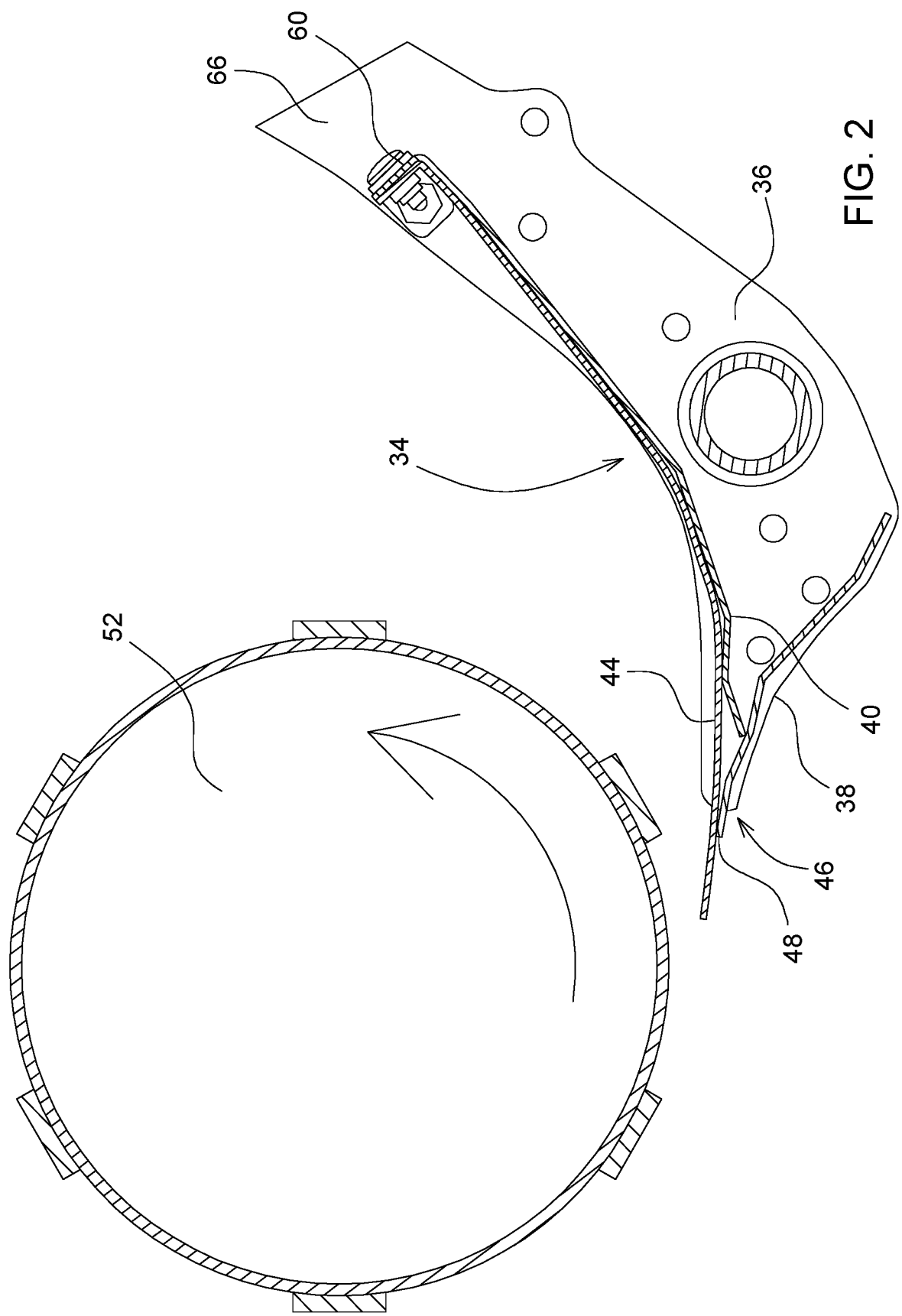
FIG. 2 an enlarged schematic side view of the supply device from FIG. 1.

The supply device 34 is depicted in detail in FIG. 2. It comprises a snout-like supply arm 36, which comprises a lower guide plate 38 and an upper clamping and entrainment plate 40, between which the wrapping material 33 is conducted. By a previously set tension, the clamping and entrainment plate 40 presses on the guide plate 38, so that the wrapping material is clamped in and with a movement of the supply arm 36 in the direction of the bale chamber 20, the wrapping material 33 is pulled from the supply roller 32. This is, moreover, supported by a tooth system 42 that is hooked with the wrapping material 33 (see FIGS. 3 and 4) on the clamping and entrainment plate 40, which is constructed on the edge of the clamping and entrainment plate 40, facing one of the bale chambers.

Furthermore, a shielding layer 44 is located on the supply arm 36, on the upper side of the clamping and entrainment plate 40; it essentially covers both the upper side of the clamping and entrainment plate 40 and also a snout-shaped end area 46 of the supply arm 36, facing the bale chamber 20, and thus also a wrapping material end 48, protruding from the end area 46, projects, and also covers and shields, in the direction of the bale chamber 20.

An area of the bale chamber 20, facing the supply device 34, is provided with a supply opening 50, which is formed by a slit, which is provided between two compacting rollers 52, 54—namely, an upper compacting roller 52 and a lower compacting roller 54. The shielding layer 44 (or also a shielding mat), located on the upper side of the supply device 34, shields the wrapping material end 48 of the wrapping material 33, to be introduced, relative to the upper compacting roller 52 of the supply opening 50.

With the introduction of a wrapping operation, the snout-shaped end area 36 of the supply arm 36 on the boundary area of the bale chamber 20 is conducted, by a mechanically triggered supply movement of the supply arm 36, in the direction of the bale chamber 20, in particular, in the direction of the supply opening 50, so that the free wrapping material end 48 can come into contact with the lower compacting roller 54 of the supply opening 50 and/or with the round bale that is rotating in the bale chamber 20, and the wrapping material is carried along and taken up. By rotation of the round bale, the wrapping material 33 is wrapped, in one or more layers, around the circumference of the round bale. The wrapping operation is concluded with a separation operation (not depicted) by a cutting device 56, in which the wrapping material, wrapped around the round bale, is separated from the wrapping material 33 in stock.

Figure 3:
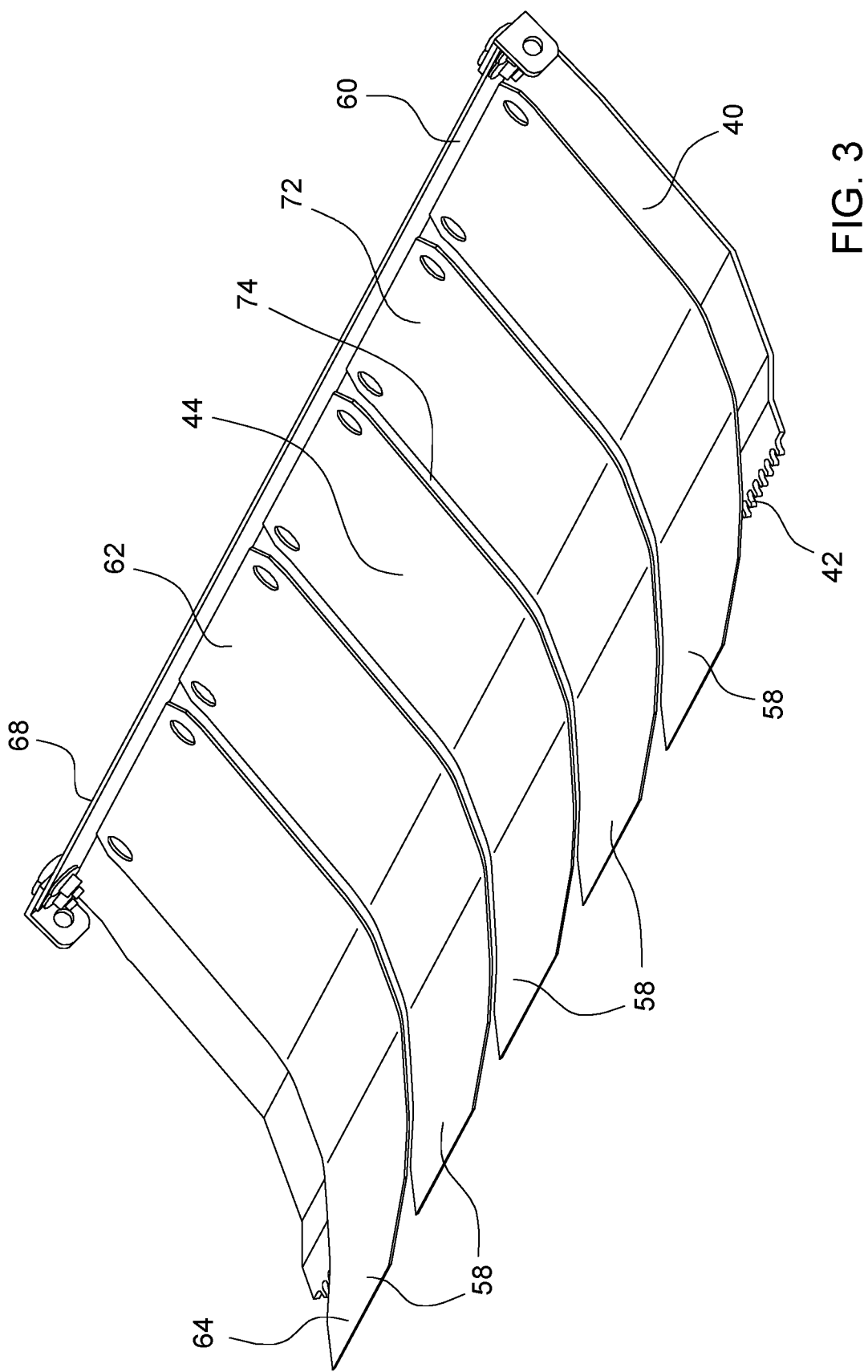
FIG. 3 a perspective side view of a shielding layer of the supply device from FIG. 1 and FIG. 2 in a first embodiment.
Figure 4:
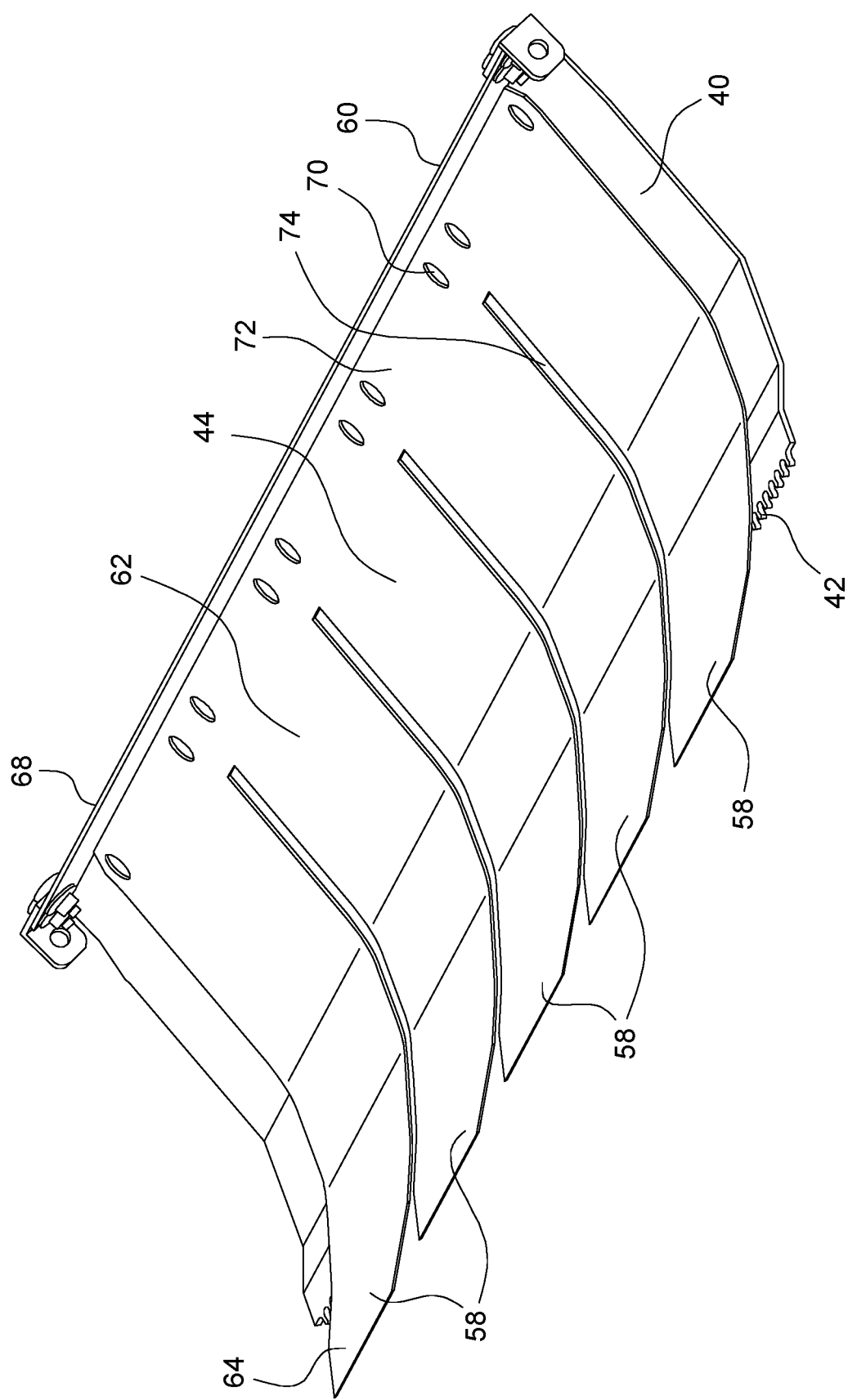
FIG. 4 a perspective side view of a shielding layer of the supply device from FIG. 1 and FIG. 2 in another embodiment.

As can be seen in FIGS. 3 and 4, the shielding layer 44 comprises the shielding lips 58 or shielding layer segments, which are located parallel to one another along the width of the bale chamber 20 and which extend in the direction of the interior of the bale chamber 20 and with the supply movement of the supply arm 36, mentioned above, are conducted into the supply opening 50. As a result of the small slit width of the supply opening 50, it is occasionally not improbable that the shielding layer 44 or the individual shielding lips 58 and the upper compacting roller 52 at least partially come into contact. This can lead to a part of the shielding layer 44 being carried along by the compacting roller 54 and, as already described, being folded or turned up or down. However, as a result of the formation of the shielding layer 44 selected here—namely, a formation with several shielding lips 58 arranged in parallel—a folding or turning up or down of the shielding layer 44 is only partial, that is, in segments or only relative to the affected shielding lip 58. The nonaffected part of the shielding layer 44 or the nonaffected shielding lips 58 can thus continue to comply, unhindered, with their function for the protection of the wrapping material 33. Thus, the problems occurring during the supply of wrapping material 33 with a traditional continuous shielding layer 44, or one formed without individual shielding lips 58—in particular, a folding or turning up or down of the wrapping material 33 that accompanies the folding or turning up or down of the shielding layer 44 (in that the wrapping material 33 is subjected to the upper compacting roller 52, exposed and unprotected)—is minimized, and an insufficient or failed carrying along of the wrapping material 33 by the round bale can be avoided.

The shielding layer 44 or the individual shielding lips 58 or shielding segments are affixed to a shielding lip holder 60, which extends along the width of the bale chamber 20. The shielding lips 58 extend thereby from a stationary end 62, connected with the shielding lip holder 60, to a free end 64, in the direction of the interior of the bale chamber 20. The shielding lip holder 60 can, for example, be formed by a component 68, which extends on a frame 66 of the supply device 34 and over the width of the bale chamber 20, in the form of a track, clamping strip, angle profile, rod, etc. Connections 70, such as screwing connections, hinges, rivets, clamping connections, or others, with which the entire shielding layer 44 or the individual shielding lips 58 or shielding layer segments are affixed to the supply device 34, can be provided.

On the free end 64 of a shielding lip 58 or a shielding layer segment, it is shaped so it tapers in its width, so that the shielding lips 58 are reduced in their width on their free end 64. In this way, rounded-off or beveled corner contours are formed on the free ends 64 of the shielding lips 58.

The shielding layer 44 (or also the shielding mat), located on the supply device 34, is produced from an elastic material, for example, from rubber or a mat-shaped deformable plastic. It should be guaranteed that the material has certain elastic characteristics, so that with a folding or turning up or down of the shielding layer, an independent "springing back" of the folded or turned-up or turned-down area takes place.

The shielding lips 58 are connected with the shielding lip holder 60 in a detachable manner, so that with damage or wear and tear of the shielding lip holder 60, they can be separately replaced or exchanged.

As can be seen in FIG. 3, the shielding lips 58 can be clamped or held individually in the shielding lip holder 60. By a connection of the individual shielding lips 58, provided separately from one another, on the shielding holder 60, an exchange can take place in segments, without having to renew the shielding layer 44 over the entire width.

As is depicted in FIG. 4, for reasons having to do with manufacturing technology or because of material costs, it may be sensible for the shielding layer 44 to comprise a shielding lip base 72, with which the shielding lips 58 are connected on their stationary end 62, in a detachable or nondetachable manner. In this case, the shielding lip base 72 is clamped or held in the shielding lip holder 60. Thus, as in the embodiment example depicted in FIG. 3, the individual shielding lips 58 can be arranged parallel to one another along the width of the bale chamber 20, separated from one another by spacing slits 74. In the embodiment example depicted in FIG. 4, the shielding lips 58, however, are connected with one and the same shielding lip base 72. The latter can, for example, take place by welding, screwing, cementing, or they can be cut or made from one piece, together with the shielding lip base 72. The shielding lip base 72 thereby serves as a connecting element between the shielding lips 58 and the shielding lip holder 60, wherein the embodiments already mentioned above, in particular, the development forms and affixing modes for the shielding lip holder 60, are to be used here also.

The invention claimed is:

1. A bale wrapper for a round baler, comprising:
a supply device comprising an upper plate which presses on a lower plate, the upper and lower plates configured to clamp wrapping material between the plates, the supply device extending along a width of a bale chamber of a round baler, for the introduction of wrapping material into the bale chamber,
wherein the supply device further comprises a shielding layer, located on an upper side of the upper plate at least partially covering the upper side of the upper plate, for the upper-side shielding of a free end of the wrapping material to be introduced into the bale chamber, wherein the shielding layer includes several individual shielding lips, with each of the several individual shielding lips arranged parallel to one another along the width of the bale chamber, and extending in a direction toward an interior of the bale chamber, wherein each of the several individual shielding lips begin on the upper side of the upper plate and extend beyond the upper plate in the direction towards the interior of the bale chamber, wherein each of the several individual shielding lips extend from a stationary end to a free end, in the direction of the interior of the bale chamber, a shielding lip holder extending along the width of the bale chamber and including a device in which each of the several individual shielding lips is individually clamped or held in place, and wherein each of the several individual shielding lips is elastic and not directly connected to any other of the several individual shielding lips, such that each of the several individual shielding lips is operable to bend separately from any other of the several individual shielding lips to not affect a position of any other of the several individual shielding lips.

2. The bale wrapper of claim 1, wherein the shielding lips are reduced in their width on their free ends.

3. The bale wrapper of claim 1, wherein the shielding lips are connected with the shielding lip holder in a detachable manner.

4. A round baler comprising the bale wrapper according to claim 1.

* * * * *